(12) United States Patent
Hursey et al.

(10) Patent No.: US 11,868,821 B2
(45) Date of Patent: *Jan. 9, 2024

(54) SURROGATE PROCESS CREATION TECHNIQUE FOR HIGH PROCESS-PER-SERVER SCENARIOS

(71) Applicant: International Business Machines Corporation, Armonk, NY (US)

(72) Inventors: Joshua J. Hursey, La Crosse, WI (US); David Solt, Frisco, TX (US); Austen William Lauria, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,411

(22) Filed: Jan. 17, 2023

(65) Prior Publication Data

US 2023/0153175 A1 May 18, 2023

Related U.S. Application Data

(63) Continuation of application No. 17/190,086, filed on Mar. 2, 2021, now Pat. No. 11,593,183.

(51) Int. Cl.
*G06F 9/46* (2006.01)
*G06F 9/52* (2006.01)

(52) U.S. Cl.
CPC ...................... *G06F 9/52* (2013.01)

(58) Field of Classification Search
CPC ........................................................ G06F 9/52
See application file for complete search history.

(56) References Cited

U.S. PATENT DOCUMENTS

2005/0223378 A1 10/2005 Musa

OTHER PUBLICATIONS

"Open-mpi / ompi," #4532, printed: Jun. 11, 2020, 5 pages, https://github.com/open-mpi/ompi/pull/4532.
"Posix_spawn, posix_spawnp—spawn a process (Advanced Realtime)," The Open Group Base Specifications Issue 7, 2018 edition, IEEE std 1003.1-2017 (Revision of IEEE Std 1003.1-2008), 9 pages. https://pubs.opengroup.org/onlinepubs/9699919799/functions/posix_spawn.html.
Anonymous: "c-Fork parent child communication—Stack Overflow." (Jan. 23, 2017), XP055925291, Retrieved from the Internet: http://web.archive.org/web/20170123230528/http://stackoverflow.com/questions/14170647/fork-parent-child-communication [retrieved on May 25, 2022] 2 pages.
Geng, T., "A Fine-Grain Parallel Execution Model for Homogeneous/Heterogeneous Many-Core Systems," Dissertation, UC Irvine, 2018, 129 pages.
Gupta, A., "A Multi-Level Scalable Startup for Parallel Applications," Thesis, University of Illinois, 2011, 53 pages.

(Continued)

*Primary Examiner* — Gregory A Kessler
(74) *Attorney, Agent, or Firm* — Nathan M. Rau

(57) ABSTRACT

A system and method for launching parallel processes on a server configured to process a number of parallel processes. A request is received from a parallel application to start a number of parallel processes. In response to this request a launcher creates a surrogate. The surrogate inherits communications channels from the launcher. The surrogate then executes activities related to the launch of the parallel processes, and then launches the parallel processes. The parallel processes are launched and the surrogate is terminated.

19 Claims, 5 Drawing Sheets

(56) References Cited

OTHER PUBLICATIONS

Hursey Joshua: "Design Considerations for Building and Running Containerized MPI Applications", 2020 2nd International Workshop on Containers and New Orchestration Paradigms for Isolated Environments in HPC (CANOPIE-HPC), IEEE, Nov. 12, 2020 (Nov. 12, 2020), pp. 35-44, XP033898786, DOI: 10.1109/CANOPIEHPC51917 . 2020.00010 [retrieved on Dec. 16, 2020].
International Application PCT/EP2022/055082. Notification of Transmittal of the International Search Report and Written Opinion, dated Jun. 3, 2022. 14 pages.
List of IBM Patents or Patent Applications Treated as Related (2023) 2 pgs.
Mell et al., "The NIST Definition of Cloud Computing," Recommendations of the National Institute of Standards and Technology, U.S. Department of Commerce, Special Publication 800-145, Sep. 2011, 7 pgs.
Under Construction. OpenPMIx. https://openpmix.github.io/support/how-to/example-indirect-launch-debugger-tool. Retrieved on May 25, 2022.
Vfork(2)—Linux manual page, http://man7.org/linux/man-pages/man2/vfork.2.html <Retrieved Dec. 7, 2020>.

_US 11,868,821 B2_

SURROGATE PROCESS CREATION TECHNIQUE FOR HIGH PROCESS-PER-SERVER SCENARIOS

BACKGROUND

The present disclosure relates to launching parallel processes for a parallel application, and more specifically launching parallel processes using a surrogate.

Current process for launching parallel processes is to launch the processes in a serial manner. This approach creates significant overhead in the system and impacts the overall performance of the underlying system. As the launch mechanism for launching the parallel processes has many responsibilities the resulting increase in the memory footprint causes even more overhead to be placed on the system during process creation.

SUMMARY

Embodiments of the present disclosure are directed to a method for launching parallel processes on a server. A request is received from a parallel application to start a number of parallel processes. In response to this request a launcher creates a surrogate. The surrogate inherits communications channels from the launcher. The surrogate then executes activities related to the launch of the parallel processes, and then launches the parallel processes. The parallel processes are launched and the surrogate is terminated.

Embodiment of the present disclosure are directed to a system for launching parallel processes on a server configured to process a number of parallel processes. The system includes a parallel application configured to request a number of parallel processes, and a launcher configured to create a surrogate. The launcher is further configured to coordinate with other system services, provide runtime information to peer process, and make resource allocations to processes. The surrogate is configured to launch the number of parallel processes without further involvement of the launcher.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
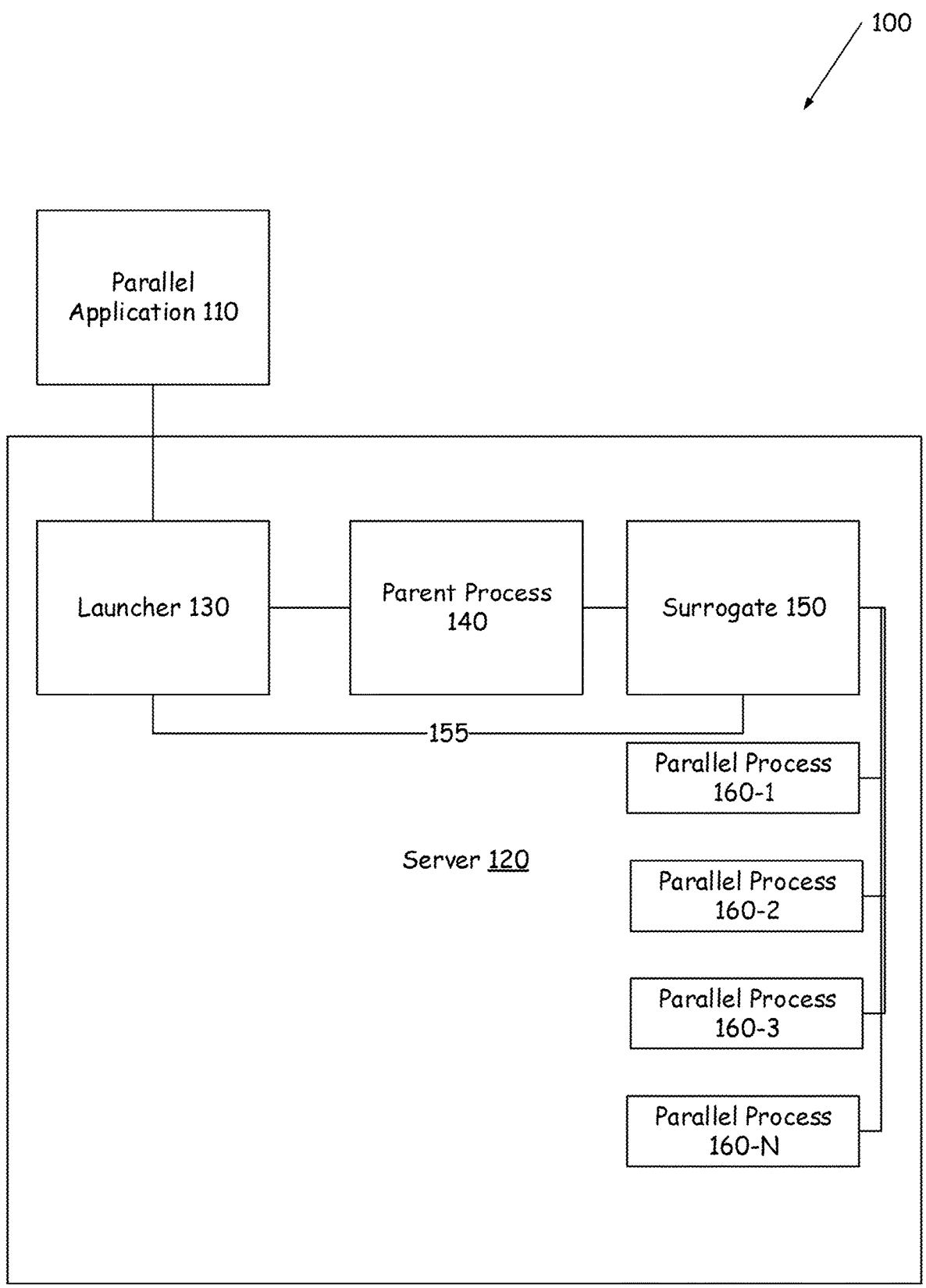
FIG. 1 is a block diagram illustrating a system for launching a number of unique cooperating processes on a server at the same time according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to launching parallel processes for a parallel application, and more specifically launching parallel processes using a surrogate. While the present disclosure is not necessarily limited to such applications, various aspects of the disclosure may be appreciated through a discussion of various examples using this context.

FIG. 1 is a block diagram illustrating a system for launching a number of unique cooperating processes on a server at the same time. System includes a parallel application 110, a server 120, a launcher 130, a parent process 140, and a surrogate 150.

Parallel application 110 is an application that divides a large task into a number of smaller processes that execute at or near the same time. Each of these smaller processes are referred to as parallel or child processes 160 160-1, 160-2, 160-3, ... 160-N (collectively 160). The computational task of the parallel application 110 as represented by the parallel processes 160 are executed independently of each other and the results of their completion are then combined to generate a final result. However, in some embodiments the parallel processes can communicate with other parallel processes to share data and/or coordinate their actions. The parallel application 110 can implement bit-level parallelism, instruction level parallelism, task parallelism, or superword level parallelism.

The server 120 is a component of the system that processes requests from the parallel application 110. The server 120 contains a large number of execution units. These execution units are often organized into sockets, cores, and hardware threads. The parallel application 110 using one or more servers can decide to place one process (or thread) per the smallest execution unit to drive the maximum amount of performance from the server for their application.

The launcher 130 is a parallel application 110 launch mechanism that is responsible for starting all of the processes in the parallel application 110 at the same time on the set of servers assigned to the application. The launcher 130 directs the creation of the processes, sets up the environment for the processes, registers them with system monitoring services, maps those processes to the execution units, and binds server resources to each process. The launcher 130 further routes standard input and output for each process to a central location. However, other locations can be used. This approach to launching the processes is overhead in the system. The launcher 130 is further configured to minimize this overhead to increase system utilization. The launcher 130 can exist on the server that the processes are launched on or can be located on different server.

In Linux, a single process is created by using the fork( ) function call that logically duplicates the memory of the parent process 140 into the child process 160. This operation does not actually copy the memory of the parent process 140 but instead makes a copy of the parent process 140's page table and uses a copy-on-write mechanism to improve the efficiency of fork( ) before a later exec( ) call in the child process 160. The fork( ) system call is serialized in the kernel when creating the child process 160 with overhead in relation to the memory footprint of the parent process 140. The overhead of the copy-on-write mechanism is in relation to the degree to which the parent and child process 160 change memory pages while linked this way. If the copy-on-write mechanism is not in place then the fork overhead can cause considerable limitations on the functionality of the system.

The launcher 130 implements an efficient mechanism to start N unique, cooperating processes on a server 120 at the same time. The launcher 130 in addition to creating the processes is tasked with coordinating with other system services, providing runtime information to peer and child processes 160, and allocating resources on the server 120. Other additional tasks can also be given to the launcher 130. Given the number of additional tasks that are placed on the launcher 130, the launcher 130 has a moderate and often changing memory footprint that causes additional process creation overhead in the fork( ) system call. Parallel applications placing a large number of processes-per-server incur high overheads associated with process creation because of these factors.

The parent process 140 is a process that is created by the launcher 130. The launcher 130 is commonly the parent process 140 for the fork( ) system call. If the launcher 130 resides on a different server then it will create a delegate launcher parent process 140 on the designed server. The parent process 140 is configured to create communication channels (e.g., pipe file descriptors) for each of the N child processes 160. The parent process 140 is further configured to establish for each of the child processes 160 any system resources that are required to be established for the initial fork( ) call.

The surrogate 150 is a component of the system that is configured to perform the process of creating the child processes 160. The surrogate 150 is created by the parent process 140 when the initial fork is called. The surrogate 150 inherits all of the communications channels for each child process 160 from the parent process 140, and passes these channels to the child as the child is created by the surrogate 150. The surrogate 150 also relays commands from the launcher 130 and parent process 140 to each child process 160. In some embodiments the surrogate 150 monitors each child process 160 during the execution of the child process 160 and notifies the launcher 130 and/or parent process 140 of the completion of the child processes 160. In some embodiments the surrogate 150 terminates itself once all of the child processes 160 have been launched. In this embodiment, the child processes 160 are left without a parent (orphaned) and then must be reparented to either the launcher 130 or the parent process 140. Similar to the launcher 130, the surrogate 150 can be created on the server that the processes are launched on or can be located on different server. The launcher 130 and the surrogate 150 can be on different servers.

Figure 2:
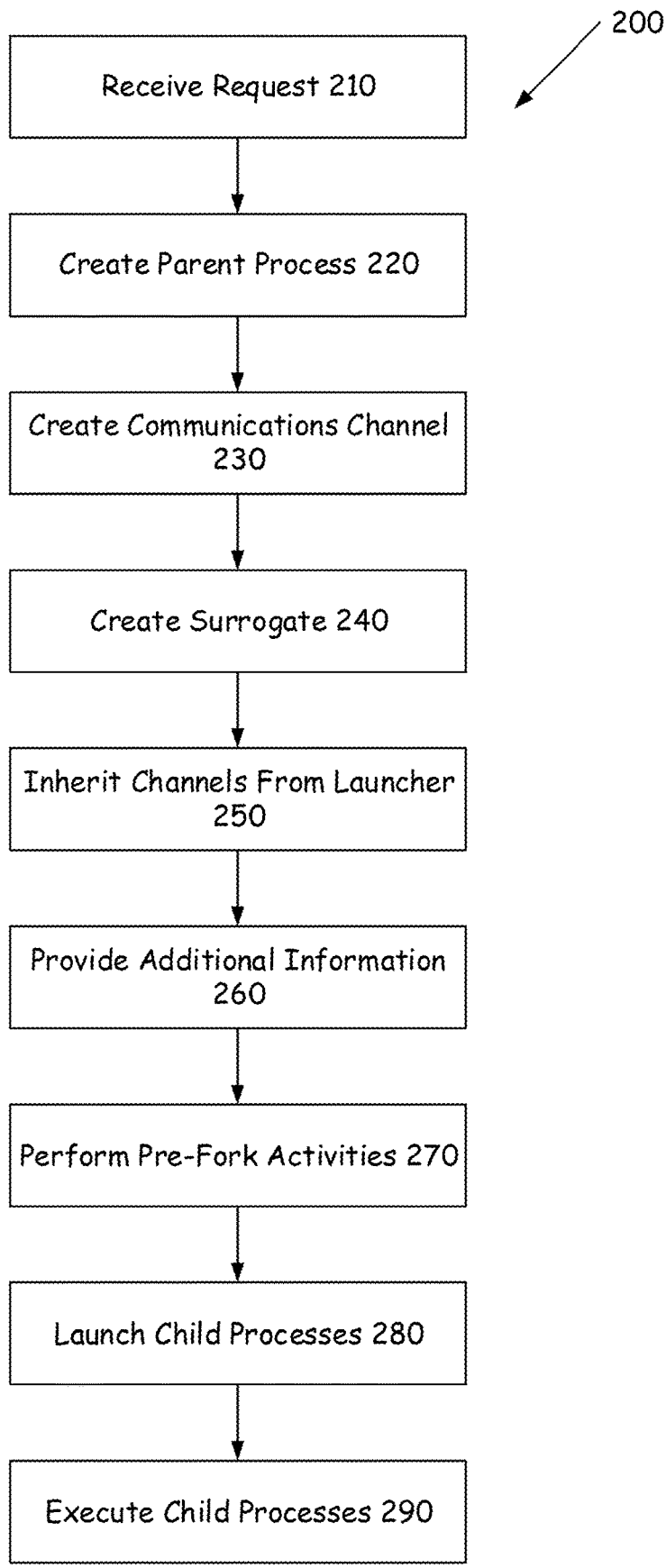
FIG. 2 is a flow diagram illustrating a process for efficiently launching parallel processes using a surrogate while leaving a launcher free to perform other tasks according to embodiments.

FIG. 2 is a flow diagram illustrating a process 200 for efficiently launching parallel processes using a surrogate 150 while leaving a launcher 130 free to perform other tasks.

The process begins when the launcher 130 receives a request from the parallel application 110 to start a number of processes on a server 120. This is illustrated at step 210. The number of processes that are requested can be any number of processes N. In some embodiments, the request is for a specific server. However, the request can be a general request for the application to start on a server or any set of servers. In this embodiment, the launcher 130 can choose a particular server to host the application. The launcher 130 can select the server based on expected performance of the server, the number of processes already executing on the server, or any other metric that is available to the launcher 130.

The launcher 130 implements the surrogate 150 of the present disclosure for all launches of the process requested. However, in some embodiments, the launcher 130 can decide to implement the surrogate 150 on some, but not all of the processes requested. In some embodiments, the launcher 130 can implement the surrogate 150 on a number of processes that exceed a predetermined threshold number of processes for N number of processes requested. That is, for example, the request was for 400 processes and the threshold number of processes is 200, then the launcher 130 would use the surrogate 150 for 200 instances of the process while launching normally the remaining 200 instances of the process. In some embodiments, the launcher 130 can decide to use multiple surrogate 150 processes each responsible for a portion of the child process launches.

The launcher 130 creates a parent process 140 prior to creating the surrogate 150. This is illustrated at step 220. The parent process 140 creates a communication channel set (e.g., pipe file descriptors) for each of the N child processes 160 resulting in N communications channels. The parent process 140 also establishes for the child processes 160 any system resources that are required to be established for the first fork( ) call.

The launcher 130 also creates a communication channel (e.g., a pipe file descriptor) dedicated to launcher-to-surrogate 150 communication. This is illustrated at step 230.

The parent process 140 then creates the surrogate 150. This is illustrated at step 240. In some embodiments, the parent process 140 creates the surrogate 150 by calling the primary fork( ) The surrogate 150 calls exec( ) on a dedicated surrogate 150 binary for the surrogate 150 activity. The surrogate 150 is configured to minimize the activity necessary to be completed between the fork( ) call and surrogate 150 exec( ) call.

Once the surrogate 150 has been created, the surrogate 150 inherits communications channels from the launcher 130 and parent process 140. This is illustrated at step 250. At this step, the surrogate 150 inherits the N communication channel sets for the children and the launcher-to-surrogate 150 communication channel 155 across the fork( ) and exec( ) calls.

The launcher 130 provides additional information to the surrogate 150. This is illustrated at step 260. The launcher 130 uses the launcher-to-surrogate 150 communication channel 155 to instruct the surrogate 150 which of the N communication channels go to which child process 160 that will be created by the surrogate 150. Additionally, the launcher 130 can inform the surrogate 150 of general activities (e.g., environment variables, interactions with system services, etc.) that apply to all processes before the fork( ) call and after the exec( ) call, and per-process specific activities (e.g., environment variables, binding, synchronization requirements with the launcher 130 parent before the exec( ) call) that apply to specific processes.

The surrogate 150 performs the general activities designated to be performed before the fork( ) call. This is illustrated at step 270. The surrogate 150 then launches each of the N processes in quick succession. This is illustrated at step 280. In each child process 160, after the fork( ) call but before the exec( ) call the N−1 communication channels not intended for this child process 160 are closed and the one communication channel dedicated to this child is connected directly to the launcher 130. If the launcher 130 is required to take action per child process 160 after the fork( ) call but before the exec( ) call the launcher 130 can coordinate that activity through the surrogate 150. However, in some embodiments the launcher 130 can take the action on its own by using the communication channel with that one child process 160 directly without involving the surrogate 150.

Once the child processes 160 are launched, they are allowed to proceed to execute. This is illustrated at step 290. In some embodiments, if a synchronized execution is desired, the surrogate 150 then only allows the child processes 160 to execute once all child processes 160 have reached the synchronization point. In some embodiments, the child processes 160 can initiate the exec( ) call as soon as they are ready to do so. In this embodiment, the surrogate 150 uses the launcher-to-surrogate 150 communication channel 155 to inform the launcher 130 that the N children have been stared and their per-process identifiers (PID) for tracking.

If the operating system allows for re-parenting of the child processes 160 then the surrogate 150 transfers ownership/control of the N children to the launcher 130 at the time of the execute call. After which the surrogate 150 can terminate. However, if the operating system does not allow for re-parenting of the child processes 160 then the surrogate 150 must persist until the last child has exited. The surrogate 150 uses the launcher-to-surrogate 150 communication channel 155 to provide the launcher 130 a protocol based channel to perform per child tracking (e.g., waitpid) and control (e.g., signaling) operations that are not permitted by the operating system for indirectly connected processes.

Figure 3:
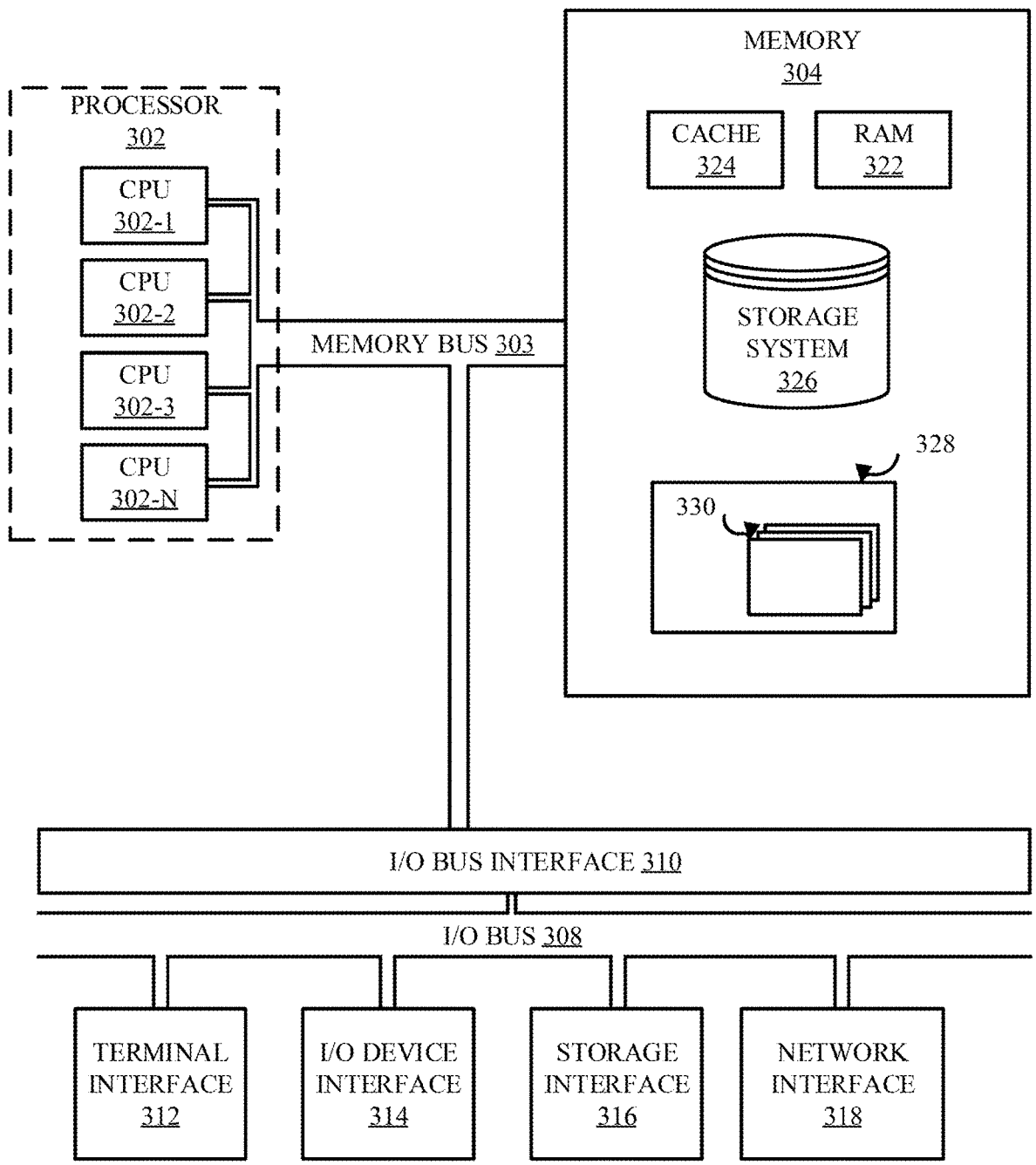
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), such as the surrogate process for launching parallel processes in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301 that implements the surrogate process of the present disclosure. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
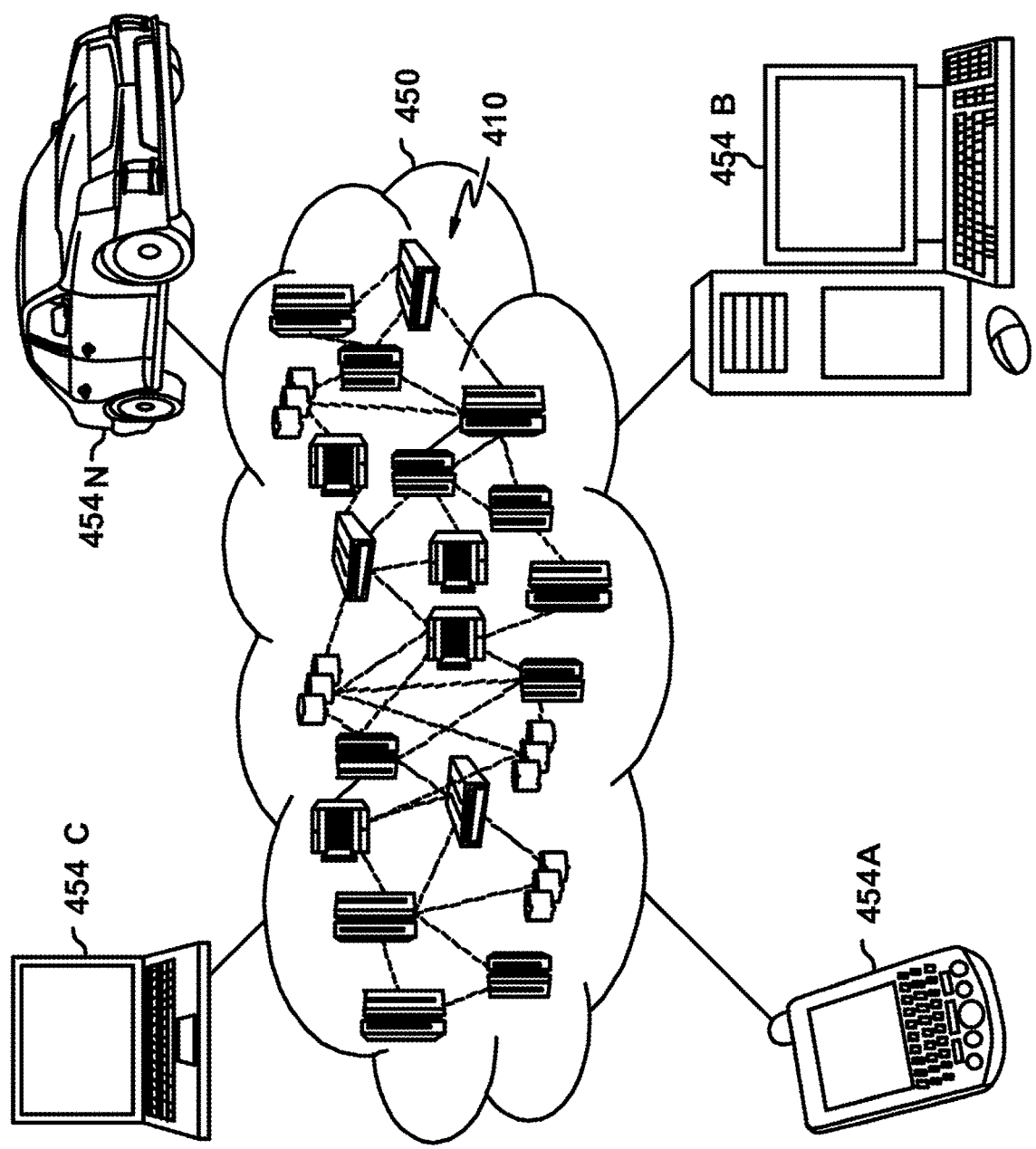
FIG. 4 is a diagrammatic representation of an illustrative cloud computing environment.

The system 100 may be employed in a cloud computing environment. FIG. 4, is a diagrammatic representation of an illustrative cloud computing environment 450 according to one embodiment. As shown, cloud computing environment 450 comprises one or more cloud computing nodes 454 with which local computing devices used by cloud consumers, such as, for example, personal digital assistant (PDA) or cellular telephone 454A, desktop computer 454B, laptop computer 454C, and/or automobile computer system 454N may communicate. Nodes 454 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 454 and cloud computing environment 450 may communicate with any type of computerized device over any type of network and/or network addressable connection (e.g., using a web browser).

Figure 5:
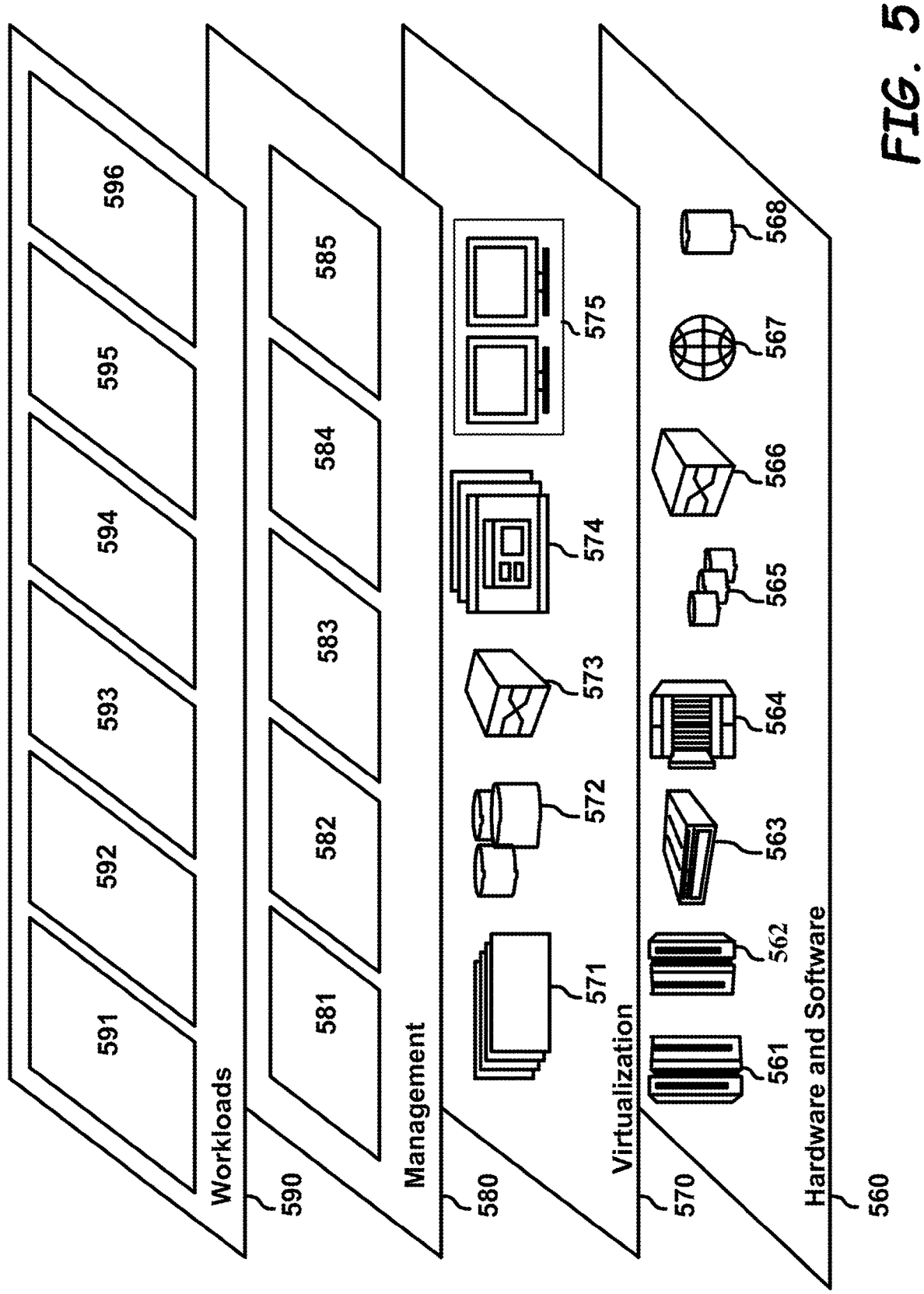
FIG. 5 illustrates a set of functional abstraction layers provided by cloud computing environment according to one illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; layout detection 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for launching parallel processes comprising:
   creating by a launcher a parent process and then a surrogate, in response to a request to start a number of parallel processes;
   inheriting by the surrogate communications channels from the launcher;
   executing by the surrogate activities related to launch of the number of parallel process prior to a fork call;
   launching the number of parallel processes by the surrogate;
   executing the parallel processes; and
   terminating the surrogate.

2. The method of claim 1 wherein only a portion of the number of parallel processes are launched using the surrogate.

3. The method of claim 1 further comprising:
   creating, by the parent process, a communications channel for each of the parallel process.

4. The method of claim 1 further comprising:
   establishing, by the parent process, systems resources for each of the parallel processes.

5. The method of claim 4 wherein the systems resources are those resources required prior to an execution of an exec call by each of the parallel processes.

6. The method of claim 1 wherein launching further comprises:
   allowing the number of parallel processes to proceed to an associated execute call; and
   halting an execution of the associated execute call until all of the number of parallel processes have reached the associated execute call.

7. The method of claim 1 wherein executing the number of parallel processes further comprises:
   providing, by the surrogate, the launcher through a launcher-to-surrogate communications channel an indication that the number of parallel processes have been started and a per process identifier for each of the number of parallel processes.

8. The method of claim 1 further comprising:
   prior to terminating the surrogate, transferring ownership of the number of parallel processes to the launcher.

9. The method of claim 8 wherein transferring occurs when the number of parallel processes execute.

10. The method of claim 8 wherein transferring comprises:
    providing a launcher-to-surrogate communications channel;
    sending to the launcher through the launcher-to-surrogate communications channel parallel process tracking for each of the number of parallel processes; and
    receiving by the surrogate from the launcher through the launcher-to-surrogate communications channel control operations for the number of parallel processes.

11. The method of claim 10 wherein the control operations are operations that are not permitted by an operating system for indirectly connected processes.

12. A system for launching parallel processes comprising:
    a server configured to process a number of parallel processes in response to a request for the number of parallel processes;
    a launcher configured to create a parent process and then a surrogate; and
    the surrogate configured to launch the number of parallel processes without further involvement of the launcher.

13. The system of claim 12 further comprising:
    wherein the parent process is configured create communications channels for each of the number of parallel processes.

14. The system of claim 13 wherein the parent process is further configured to establish for each of the number of parallel processes any system resources required by the number of parallel process prior to a fork call for each of the number of parallel processes.

15. The system of claim 12 further comprising:
    a launcher-to-surrogate communication channel created by the launcher and configured to allow communication between the launcher and the surrogate.

16. The system of claim 12 wherein the surrogate launches only a portion of the number of parallel processes and the launcher launches a remaining number of the number of processes.

17. The system of claim 12 wherein the surrogate is configured to reparent the number of parallel processes to the launcher after launching the number of parallel processes.

18. The system of claim 17 wherein the surrogate is configured to terminate following reparenting.

19. A computer-readable storage medium having computer-executable instructions that when executed by at least one computer cause the computer to:
    create by a launcher a parent process, and then a surrogate, in response to a request to start a number of parallel processes;
    inherit by the surrogate communications channels from the launcher;
    execute by the surrogate activities related to launch of the number of parallel processes prior to a fork call;
    launch the number of parallel processes by the surrogate;
    execute the parallel processes; and
    terminate the surrogate.

* * * * *